Patented June 29, 1937

2,085,519

UNITED STATES PATENT OFFICE 2,085,519

METHOD OF TREATING MINERAL OILS

Cedric Gerard Verver, Amsterdam, Netherlands, assignor to Shell Development Company, San Francisco, Calif., a corporation of Delaware No Drawing. Application July 30, 1935, Serial No. 33,870. In the Netherlands August 6, 1934

4 Claims. (Cl. 196—19)

My invention relates to a process for the manufacture of oil entirely or partially freed from paraffin wax and for the manufacture of paraffin wax from paraffinous oils, and is particularly concerned with the separation of paraffin wax from hydrocarbon oils.

When paraffinous crude hydrocarbon oils are distilled, distillates and residues are obtained which contain waxy paraffins which, at normal or elevated temperatures, are dissolved in the oil, but which solidify at lower temperatures and cause the oils to resist flow or to show cloudiness, and render the oils unsuitable for the intended use. The separation of the paraffin wax from these distillates or residues by chilling the oil to solidify the wax and mechanically removing the solidified wax from the liquid oil is, however, often difficult because the wax frequently solidifies in a form which is difficult to filter. Moreover, considerable quantities of oil are found to adhere to the solidified wax, with the result that the yield of the dewaxed oil is low and the resulting wax must be further treated to de-oil it in order to produce a marketable high melting wax, this disadvantage being encountered in cold settling or centrifuging as well as in filtration methods. Insofar as these paraffinous distillates and residues are not easily filterable, recourse has hitherto been had to a redistillation or to centrifuging which may be either combined or not with other means for promoting the separation of the paraffin wax. In this connection it is important to note that redistillation in particular has the drawback of unfavorably affecting the quality of the paraffin wax and making it less suitable for the manufacture of ceresine.

The present invention provides a simple means for facilitating the separation of the paraffin wax from the oils in that it provides a method whereby wax may be produced in a form in which it may be readily filtered from the oil, and in a form in which little or no oil adheres to the separated wax. The former feature is of especial utility in connection with filter presses, and it is for this reason of especial application to the present invention. Since, however, the reduction of the quantity of adhering oil is also desirable when other methods of separating the solid wax from the oil are employed, e. g. centrifuging or cold settling, my invention is not limited to any specific method of effecting the physical separation of the solid wax.

It has been found that a surprising improvement in the dewaxing of oils is obtained by separating the wax from the oil in the presence of a selective dewaxing diluent and of a pourpoint reducing substance, the latter being added in relatively small quantities, usually less than 5%, and preferably between $\frac{1}{10}$% and 2%.

In carrying out my invention a wax-bearing oil is mixed with a selective dewaxing diluent and with a pour-point reducing substance, both hereinafter described at normal or at elevated temperature, chilled to solidify or "precipitate" the wax, which may be either crystalline or microcrystalline, and separated from the solidified wax by any means. The separation temperature largely determines the melting point and the quantity of the wax which is separated. The dewaxing may be conducted either as a continuous or as a batch process. It is sometimes desirable to precipitate the wax in several stages, thereby producing a number of waxes of different melting points. According to this method the first precipitation and separation is carried out at a temperature which is sufficiently high to solidify only the highest melting components, and the filtrate is chilled to effect further separation of wax at one or more stages at successively lower temperatures. The amount of the dewaxing diluent may be varied at each stage so as to be present in the correct quantity to dissolve substantially all of the oil at the particular temperature while not causing the dissolution of substantial amounts of the solid wax. Thus it is often necessary to add more dewaxing diluent at each successive stage. Since the wax produced in accordance with this process contains little or no oil, this process provides a method for producing high melting point waxes.

It is desirable, but not essential, to produce a homogeneous oil-solvent system before chilling the oil to precipitate the wax. To achieve this the dewaxing diluent may be added to the oil at an elevated temperature, or the mixture of oil and diluent may, after mixing, be heated to an elevated temperature. It has, moreover, been found to be advantageous to the filterability of the chilled oil-wax-diluent pour-point reducer mixture to heat the mixture to an elevated temperature, usually between 65° C. and 95° C. before chilling. This heating has the effect of conditioning the wax to make it solidify into a form in which the oil can be filtered at a greater rate and the yield of the dewaxed oil can be further increased. It should, however, be noted that this conditioning step is not essential to the practice of my invention, because it is possible to realize the advantages of my invention by merely mixing the waxy oil, diluent and pour-point reducer at ordinary or slightly elevated temperatures and chilling the mixture to solidify the wax, and that the added steps described in this paragraph are to be regarded as optional features which may be employed to still further improve the efficiency of the dewaxing operation.

I may employ as pour-point reducers any substance which has the property, when added in small amounts, generally less than 5% and often less than 2%, to a wax-bearing oil, of lowering its pour-point. As examples may be mentioned the following:

Various pour-point reducing metallic soaps, e. g. aluminium stearate.

Compounds obtained by coupling paraffinous hydrocarbons to armatic hydrocarbons of high molecular weight, and in particular highly condensed aromatic hydrocarbons having more than three rings in their molecule, as described in the United States application of Van Peski, Ser. No. 683,298, filed August 2, 1933.

Organic compounds built up of carbon- or hetero-cyclic nuclei of five and/or six atoms and preferably long aliphatic side chains, so that in a mono-nucleus system there are more than one side chain, and in a poly-nucleus system there is at least one side chain, nitrogen and/or oxygen occurring in the nuclei and/or in the side chain, and the side chain being preferably linked to the nucleus through an ether, ester, keto amido group.

Certain of these oxygen and/or nitrogen containing substances which contain cyclic nuclei and aliphatic side chains may be represented by a structural formula R—C(O)—R' where R— represents an organic radical containing a high molecular aliphatic chain and —R' represents —O—R'' wherein R'' equals an organic cyclic radical or —R' represents an organic cyclic radical, or —R' represents —N(R''')—R$^{Iv}$ wherein —R''' and —R$^{Iv}$ represent not more than one hydrogen atom and at least one organic cyclic radical or R'' and R$^{Iv}$ are part of an organic cyclic structure, at least two radicals of the group consisting of ester, keto, ether and amido radicals being linked to R', R'', R''', or R$^{Iv}$ when R'' are monocyclic or R''' and R$^{Iv}$ represent only one monocyclic nucleus or R''' and R$^{Iv}$ are part of a monoheterocyclic structure.

These substances are, for example, obtained as reaction products of the fatty acids and/or alcohols with cyclic compounds whose molecules contain one or more primary and/or secondary amino, and/or hydroxy and/or polyhydroxy, and/or amino hydroxy groupings. The mono- or poly-cyclic nuclei to which one or more radicles of a fatty acid and/or an alcohol are attached may be either heterocyclic or carbocyclic. The nitrogen atom or atoms connecting the cyclic nucleus with the fatty acid radicles may be either within the nucleus as in axines or oxyazines, or attached directly to a carbon atom of the nucleus.

The reaction employed in the formation of these substances is well known. They may, for example, be prepared by reacting a compound containing a cyclic nucleus and a nitrogen radical, such as 1, 3, phenylene diamine, indigo, or Bismark brown with fatty acids, or their anhydrides, or corresponding acyl halides; or by reacting a compound containing a cyclic nucleus and an hydroxy group, such as di- and/or tri-hydroxy benzenes and their homologues, mono- or poly-hydroxy anthracenes, or mono- or poly-hydroxy anthraquinones with a higher fatty acid (or its anhydride, or acyl halide), such as stearic, palmitic, or cerotic acid, and/or with one or more of the lower and/or higher aliphatic primary, secondary, or tertiary alcohols, which may be either mono- or poly-hydroxy, and either saturated or unsaturated. The resulting products of reaction may be either ketones, ethers, esters, or amido-salts of the fatty acids used in the reaction, or mixed ethers or esters and amido salts.

Specific examples of suitable substances are: stearyl m-phenylene diamine, stearyl compound of Bismark brown, stearyl compound of indigo, tetrastearyl compounds of triaminophenol, resorcinol distearate, pyrogallol tristearate, phloroglucinol tristearate, distearate of 1, 5, dioxynaphthalene, aurine distearate, trioxy-triphenyl-methane tristearate, distearylalizarine, rufigallic acid hexastearate, distearyl naphthalene, dimyricyl ether of 1, 5, dioxynaphthalene and cerotic acid ester of cholesterol. These substances are further described in the United States application of Van Peski, Serial No. 678,716, filed July 1, 1933.

I may, moreover, use as pour-point reducing substances pyrogenetic condensation products of mineral, vegetable and animal oils and fatty acids, such as distillation residues, residues from the cracking distillation of gas oil, or heavier oils, especially oils rich in aromatic hydrocarbons, residues from the cracking distillation of petrolatum, asphaltic cracked residues, polymerized Edeleanu extract (i. e. polymerized extract derived from hydrocarbon oils by extraction with a selective solvent for aromatics, like liquid sulfur dioxide), gum fractions, pitch still residues, stearine pitch, or fractions thereof which are rich in substances possessing pour-point reducing properties. It is particularly efficacious to use substances obtained by heat-treating the above pyrogenetic condensation products (i. e. cracked residues and polymerization products) at temperatures above 300° C., preferably in the neighborhood of 350° C., and under non-cracking conditions. These products, and the method of their concentration and heat-treatment employed to improve their effectiveness are described in the United States application of Moser, Ser. No. 690,949, filed September 25, 1933.

By the expression "selective dewaxing diluent", as used in the present specification and claims, I mean a liquid having the property of dissolving the liquid hydrocarbon oil to produce a liquid phase in which the solid wax is insoluble or only slightly soluble. The function of this diluent is to lower the viscosity of the chilled oil and to create a condition under which the wax has a minimum solubility in the phase containing the remainder of the oil. Such selective dewaxing diluents contain a good selective solvent in which the wax is only slightly soluble or not at all. Selective dewaxing diluents as are used in the process of the present invention may consist of only a single substance, such as secondary butyl alcohol. These good selective solvents are, however, often not sufficiently miscible with the oil to be present in the oil phase in sufficient quantities to create the desired conditions of minimum wax solubility and reduced viscosity, and it is generally necessary to use, in addition thereto, a solubility enhancing agent. This solubility enhancing agent must be a good solvent for both the selective solvent and the oil, and may itself possess selective solvent properties to a certain degree. My invention may be practiced with any of a large number of selective dewaxing diluents composed of mixtures of selective solvents and solubility enhancing agents.

Examples of substances which are suitable for use as the selective solvent component of such dewaxing diluents are:

I. Non-hydrocarbon derivatives of the following cyclic compounds: benzene rings ($C_6H_6$), heterocyclic rings (of the type $C_4H_4O$, $C_4H_4S$ or $C_4H_4NH$), pyridine rings ($C_5H_5N$) or six-membered rings with two atoms of N, or O, or N plus O, or N plus S, each with at least one of the following substituents: —OH, =CO, —CHO, —COOH, —R, —COOR (where R stands for an alkyl or aryl radical), —Cl, —Br, —I, —$NO_2$, —$NH_2$, —ONO, —SH, =CS, —$CONH_2$, —SCN, —CN. Also condensed ring systems containing one or more of the above ring types and certain products of industrial processes having complex compositions.

*Examples.*—Benzene nitrile, benzene nitrite, nitrobenzene, nitrotoluene, aniline, diphenyl amine, phenol, chlorophenol, cresol, cresylic acid, "acid oils" described hereinbelow, quinoline, pyridine, furfural, thiophene, thiophenol, lutidine, picoline, thionaphthol.

II. Lower aliphatic acids, hydroxy or keto acids, anhydrides of aliphatic acids, ketones, alcohols, esters of aliphatic acids with lower alcohols, and sulfur analogues of the above acids, all containing not more than four carbon atoms in the molecule.

*Examples.*—Diacetone alcohol, acetic acid, butyric acid, lactic acid, acetic anhydride, acetone, ethyl alcohol, butyl alcohol, ethyl formate, ethyl acetate, methyl carbonate, thioacetic acid.

III. Aliphatic alcohols, aldehydes, ketones, ethers, acids, acid anhydrides, hydroxy or keto acids, and sulfur analogues of the above oxygenated aliphatic compounds, all containing not more than sixteen carbon atoms in the molecule and containing at least one substituent from the group: —Cl, —Br, —I, —CN, —SH, —CS, —$CONH_2$, —SCN, —$NH_2$.

*Examples.*—Chlorex ($\beta\beta'$ dichlorethyl ether), dichlorbutyl ether, dibrommethyl ether, chloracetic acid, ethanol amine, triethanol amine, lactic acid.

IV. Relatively unreactive liquid inorganic compounds of S, Se, Te, Sn, Sb, as, for example, $SO_2$, $SnCl_4$.

The "acid oil" contained in the above list may be prepared as follows: petroleum oil, preferably cracked distillate oil, is treated with a concentrated sulfuric acid, and the sludge is removed from the mixture. The oil is then neutralized with caustic soda and the second sludge or spent alkali separated from the oil. Upon acidification of this second sludge either with an acid or with the acid sludge an oil known as "acid oil" is produced. This oil apparently contains hydroxyaromatics and possesses selective solvent action. This property can be modified by the presence of solubility enhancing agents, such as an alcohol, to produce a selective solvent mixture which is useful in my dewaxing process.

Examples of compounds of the class suitable for use as solubility enhancing agents are:

I. Aliphatic alcohols, aldehydes, acids, ethers, methyl ethyl or higher symmetrical or mixed ketones, and sulfur analogues of the above oxygenated aliphatic compounds, all containing not more than twelve carbon atoms in the molecule.

*Examples.*—Primary butyl alcohol, secondary butyl alcohol, isopropyl alcohol, propylaldehyde, diethyl acetone, diethyl ether, diethyl thioether.

II. Carbon bisulfide, aliphatic amines, esters of lower fatty acids and lower alcohols containing more than four and not more than twelve carbon atoms in the molecule, branched chain and cyclic aliphatic hydrocarbons (containing not more than twelve carbon atoms in the molecule), aromatic (and particularly bicyclic) aromatic hydrocarbons, such as benzene, toluene, naphthalene and its homologues, preferably dissolved in benzol or its homologues or equivalents, and tetraline.

Specific examples of suitable pairs of the above solvents, which may be employed as selective dewaxing diluents according to my invention are: acetone and benzene, acetone and tetraline, ethyl alcohol and benzene, quinoline and dimethyl ethyl carbinol, Chlorex and isopentane, Chlorex and ethyl ether, furfural and trimethyl carbinol. It should be noted, however, that my invention is not limited to the use of these specific solvent pairs, which have been enumerated merely as specific examples of a large class of suitable selective dewaxing mixtures.

These constituents may be mixed in any desired proportion, depending upon the amount of wax to be separated, upon the dilution ratio and upon the separation temperature. It is essential that the mixture have a high solvent power for the liquid hydrocarbons and a low solvent power for the solid hydrocarbons at the temperature at which the separation of the solid from the liquid hydrocarbons occurs. The low solubility selective solvents are effective for aiding the separation of the wax from the liquid components, due to the difference in solubility of such oil components in these solvents, but this action is limited by their low solubility in the oil at the low or moderate temperatures of the dewaxing operation. The solubility enhancing agents increase the solubility of oily components of wax-bearing oils without correspondingly affecting the solubility of the waxy components, thereby causing an efficient precipitation of the wax. Under certain conditions the latter agents have the further effect of reducing the viscosity of the oil to aid in the separation of the liquid and solid phases. With these desiderata and the functions of the components of the dewaxing diluents in view, the proper proportion of these two components may be readily determined by empirical methods in each particular case. It is often preferable to use a eutectic mixture of these components.

Suitable mixtures may, for example, consist of 50% of each of the constituents, although 75/25 or 25/75 or other ratios may be employed, according as the nature of the oil is more paraffinic or more aromatic, and according as the other factors heretofore discussed affect the solvent characteristics. It will, in general, be more advantageous to use the minimum quantity of solubility enhancing agent which is required to cause the dewaxing diluent and the oil to form a homogeneous liquid phase at the temperature at which the separation occurs, although it is possible to use even smaller amounts of the solubility enhancing agent, thereby permitting two liquid phases to be formed in the system. The dilution ratio, i. e. the volume ratio of oil to diluent mixture, will be determined by the viscosity needed at the filtration or settling temperature and will vary with the character of the oil and the viscosity of the diluents employed, but can readily be determined by one skilled in the art.

The effect of the process according to this invention will be apparent from the following comparative examples:

A paraffin oil distillate with a pour-point of about 24° C. was diluted with 400% by volume of a diluent consisting of 37½% by weight of ethyl alcohol and 62½% by weight of benzene, after which it was filtered at —20° C.

The filtration took 30 minutes. The yield of oil, calculated in per cent. by weight of the original paraffin oil distillate, amounted to 38.2% and that of the filter cake to 61.8%. The pour-point of the filtered oil was —10° C.

The same test was made in the presence of 2% activated cracked residue (i. e. cracked residue the pour-point reducing property of which has been increased by subsequent heating). In this case the filtration took 28 minutes, the yield of oil was 81.3% and the yield of filter cake 20.7% (the cake contains practically the entire quantity of pour-point reducing substance), whilst the pour-point of the filtered oil was —13° C.

With one half per cent. of distearyl-picene as pour-point reducing agent the filtration took 24 minutes, the yield of oil was 70.9%, the yield of filter cake 29.6% and the pour-point of the oil —22° C. With pour-point reducer but without diluent it proved to be altogether impossible to filter at —20° C. the whole mass being solid.

The above figures clearly show the extraordinary increase of the oil yield. The filter cake contains much less oil than when operating with diluent alone. Moreover, when working according to the invention, the period of filtration is somewhat shorter than when using diluent alone. A special advantage of using activated crack residue, which also applies to other activated pyrogenetic condensation or polymerization products of mineral, vegetable or animal oils, or fatty acids, or products obtained therefrom in any desired manner, is that the color of the filtered oil is hardly affected. The color of the filter cakes can, if desired, be easily brought up to specification by a second refining, e. g. with clay. Also the color of the oil can, if necessary, be very easily improved by a second refining.

The process according to the present invention may be applied to every paraffinous oil. It is particularly applicable to dewaxing lubricating oil and fuel oil. It should be observed that the pour-point of the filtrate is determined by the temperature at which the paraffin wax is filtered. In general it is found that the pour-point reducing substances do not affect the pour-point of the filtrate, because they are largely absorbed by the paraffin wax. If, however, a large quantity of pour-point reducing substance is added, the filtrate may show a markedly reduced pour-point. It may be further pointed out that the pour-point reducing substances which are added to highly paraffinous oils in accordance with this invention need not necessarily affect the pour-point of the particular oils being retreated. The activity of these pour-point reducers is variable, and depends upon the nature of the particular oil. Indeed, it was noted that often the pour-point reducers which are active, i. e. which lower the pour-point of the oil, in the case of one paraffin base oil, are inactive in regard to a paraffin base oil of another origin. However, the dewaxing effect of the same pour-point reducers upon both oils was always favorable, i. e. it resulted in greater yields of dewaxed oils and in a higher quality of the paraffin waxes. In some cases the pour-point of oils with very high content of paraffin wax cannot be reduced by the addition of known pour-point reducing substances. Usually the pour-point reducing activity of such substances is most prominent in the case of oils containing not too high a percentage of paraffin wax. Yet also in those cases where the pour-point reducing action is not noticeable, there is a marked improvement in the separation of the paraffin wax from the oils in the presence of the selective dewaxing diluent. Consequently the effect of the improved separation cannot be ascribed to the pour-point reducing action of the admixed substances.

I claim as my invention:

1. The process of dewaxing hydrocarbon oils, comprising the steps of admixing to a wax-bearing oil a selective dewaxing diluent and a pour-point reducing substance of the formula R—C(O)—R' wherein R— represents an organic radical containing a high molecular aliphatic chain and —R' represents —O—R'' wherein —R'' equals an organic cyclic radical or —R' represents an organic cyclic radical, or —R' represents—N(R''')—R$^{IV}$ wherein —R''' and —R$^{IV}$ represent not more than one hydrogen atom and at least one organic cyclic radical or —R''' and —R$^{IV}$ are part of an organic heterocyclic structure, at least two radicals of the group consisting of ester, keto, ether and amido radicals being linked to R', R'', R''', or R$^{IV}$ when R' or R'' are mono-cyclic or when R''' and R$^{IV}$ together represent only one mono-cyclic nucleus or when R''' and R$^{IV}$ are part of a mono-heterocyclic structure, chilling the mixture to solidify the wax and separating the solidified wax therefrom.

2. The process according to claim 1, wherein the solidified wax is separated by filtration.

3. The process according to claim 1 in which the mixture is brought to a temperature above 65° C. before chilling.

4. The process of dewaxing hydrocarbon oils, comprising the steps of admixing to a wax-bearing oil a selective dewaxing diluent and a pour-point reducing substance obtainable by reacting at least one molecule of an aliphatic compound having at least one —OH group and at least one member of the group consisting of: secondary amino-cyclic compounds, poly-amino cyclic compounds, hydroxy cyclic compounds, and hydroxy-amino-cyclic compounds, subsequently chilling the mixture to solidify the wax, and separating the solidified wax therefrom.

CEDRIC GERARD VERVER.